US009086494B2

(12) United States Patent
Han et al.

(10) Patent No.: US 9,086,494 B2
(45) Date of Patent: Jul. 21, 2015

(54) IMAGE SENSOR AND X-RAY IMAGE SENSING MODULE INCLUDING THE SAME

(75) Inventors: Sang-wook Han, Busan (KR);
Hyun-Sik Kim, Daejeon (KR);
Gyu-Hyeong Cho, Daejeon (KR);
Chang-jung Kim, Yongin-si (KR);
Jae-chul Park, Suwon-si (KR);
Young-Hun Sung, Hwaseong-si (KR);
Young Kim, Yongin-si (KR);
Jun-Hyeok Yang, Daejeon (KR)

(73) Assignees: SAMSUNG ELECTRONICS CO., LTD., Gyeonggi-Do (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 190 days.

(21) Appl. No.: 13/597,726

(22) Filed: Aug. 29, 2012

(65) Prior Publication Data

US 2013/0075608 A1   Mar. 28, 2013

(30) Foreign Application Priority Data

Sep. 23, 2011   (KR) ........................ 10-2011-0096371

(51) Int. Cl.
*G01T 1/24*   (2006.01)
*H04N 5/378*   (2011.01)
*H04N 5/374*   (2011.01)

(52) U.S. Cl.
CPC ................ *G01T 1/247* (2013.01); *H04N 5/378* (2013.01); *H04N 5/374* (2013.01)

(58) Field of Classification Search
CPC ...... G01T 1/247; H04N 5/3745; H04N 5/355; H04N 5/378; H04N 5/32; H04N 5/361; H04N 5/374

USPC ............ 250/336.1, 370.09, 370.08; 330/308; 348/300, 301, 241
See application file for complete search history.

(56) References Cited

U.S. PATENT DOCUMENTS 4,529,965 A  *  7/1985  Lee ............................... 341/122
5,363,055 A  *  11/1994  Ribner ............................ 330/9
(Continued)

FOREIGN PATENT DOCUMENTS

EP         2395566 A1    12/2011
JP       2004-147296 A    5/2004
(Continued)

OTHER PUBLICATIONS

Extended European Search Report dated May 8, 2015 for EP Application No. 12185127.3.

*Primary Examiner* — David Porta
*Assistant Examiner* — Yara B Green
(74) *Attorney, Agent, or Firm* — Harness, Dickey & Pierce, P.L.C.

(57) ABSTRACT

According to example embodiments, an image sensor includes a charge sensing amplifier configured to amplify charges sensed by a sensing unit. The charge sensing amplifier includes an input terminal, an amplification terminal, an output terminal, a first capacitor connected between the input terminal and the amplification terminal, a first switch connected between the input terminal and the amplification terminal, a second capacitor connected between the amplification terminal and the output terminal, and a second switch connected between the output terminal and a reference voltage terminal.

25 Claims, 10 Drawing Sheets

(56) References Cited

U.S. PATENT DOCUMENTS

| | | | |
|---|---|---|---|
| 5,448,056 A * | 9/1995 | Tsuruta | 250/214 A |
| 5,751,189 A | 5/1998 | Shyu et al. | |
| 6,163,029 A | 12/2000 | Yamada et al. | |
| 7,173,230 B2 * | 2/2007 | Charbon | 250/214 A |
| 7,381,963 B2 * | 6/2008 | Endo et al. | 250/370.09 |
| 7,919,993 B2 | 4/2011 | Keel et al. | |
| 8,039,811 B1 * | 10/2011 | Li et al. | 250/370.14 |
| 2007/0080299 A1 * | 4/2007 | Endo et al. | 250/370.09 |
| 2009/0128216 A1 * | 5/2009 | Rao et al. | 327/337 |
| 2009/0225211 A1 * | 9/2009 | Oike | 348/308 |
| 2010/0329425 A1 | 12/2010 | Guo et al. | |
| 2011/0210235 A1 * | 9/2011 | Dierickx | 250/214 R |

FOREIGN PATENT DOCUMENTS

| | | |
|---|---|---|
| JP | 2006-078235 A | 3/2006 |
| JP | 2010-034813 A | 2/2010 |
| KR | 2009-0090603 A | 8/2009 |
| WO | WO-2010090135 A1 | 8/2010 |

* cited by examiner

IMAGE SENSOR AND X-RAY IMAGE SENSING MODULE INCLUDING THE SAME

CROSS-REFERENCE TO RELATED APPLICATIONS

This application claims priority under 35 U.S.C. §119 to Korean Patent Application No. 10-2011-0096371, filed on Sep. 23, 2011, in the Korean Intellectual Property Office, the disclosure of which is incorporated herein in its entirety by reference.

BACKGROUND

1. Field

Example embodiments relate to image sensors and image sensing modules, and for example, to X-ray image sensors and/or X-ray image sensing modules including the same.

2. Description of the Related Art

An X-ray image may be obtained by irradiating an X-ray onto film and then developing the film. X-ray images using film require a relatively large amount of film, a developing solution, a developing machine, and a place for storing the film. Digital X-ray image sensors for obtaining digital X-ray images are being developed such that the digital X-ray images may be stored in a digital storage medium including a hard disk, a compact disc (CD) and other information storage mechanisms.

SUMMARY

Example embodiments relate to image sensors and/or image sensing modules capable of obtaining images.

Additional aspects will be set forth in part in the description which follows and, in part, will be apparent from the description, or may be learned by the practice of example embodiments.

According to example embodiments, an image sensor includes a charge sensing amplifier configured to amplify charges sensed by a sensing unit. The charge sensing amplifier includes an input terminal, an amplification terminal, an output terminal, a first capacitor connected between the input terminal and the amplification terminal, a first switch connected between the input terminal and the amplification terminal, a second capacitor connected between the amplification terminal and the output terminal, and a second switch connected between the output terminal and a reference voltage terminal.

The input terminal of the charge sensing amplifier may include an inversion input terminal and a non-inversion input terminal, and the amplification terminal may be configured to output an amplified voltage obtained by amplifying a voltage difference between the inversion and non-inversion input terminals.

The inversion input terminal may be connected to the sensing unit, and the non-inversion input terminal may be connected to the reference voltage terminal.

The first capacitor and the first switch may be connected between the inversion input terminal and the amplification terminal, and the second switch may be connected between the non-inversion input terminal and the output terminal.

The image sensor may further include a delay unit connected to the second switch.

The first switch may be configured to be turned on by receiving a reset signal, and the second switch may be configured to be turned on by receiving a delayed reset signal obtained by delaying the reset signal in the delay unit.

The first and second switches may be configured to be turned on by receiving a reset signal and a delayed reset signal, respectively, and the second switch may be configured to be turned on for a longer period of time in comparison to the first switch.

The second capacitor may have a greater capacitance than that of the first capacitor.

The image sensor may further include an image control unit configured to convert an output voltage of the output terminal into digital image information. The image control unit may include a counter.

The image control unit may further include a comparator connected between the output terminal and the counter.

An image sensing module may include a pixel array having a plurality of single pixels. Each of the single pixels may include one of the charge sensing amplifier. The single pixels may operate asynchronously to each other.

According to example embodiments, an image sensor includes a sensing unit, and a charge sensing amplifier configured to amplify charges sensed by a sensing unit. The charged sensing amplifier may include an inversion input terminal connected to the sensing unit, a non-inversion input terminal configured to receive a reference voltage, an amplification terminal configured to output an amplified voltage obtained by amplifying a voltage difference between the inversion and non-inversion input terminals, an output terminal, a first capacitor connected between the inversion input terminal and the amplification terminal, a first switch connected between the inversion input terminal and the amplification terminal, a second capacitor connected between the amplification terminal and the output terminal, and a second switch connected between the output terminal and the inversion input terminal.

The sensing unit may include one of a photoconductor, a photodiode, and a photomultiplier tube.

The image sensor may further include a delay unit connected to the second switch. The delay unit may be configured to receive a reset signal and output a delayed reset signal. The second switch may be configured to be turned on in response to the delayed reset signal. The first switch may be configured to be turned on in response to the reset signal. The second switch may be configured to be turned on for a longer duration in response to the delayed reset signal than the first switch is configured to be turned on in response to the reset signal.

A capacitance of the second capacitor may be greater than a capacitance of the first capacitor.

The first switch and the first capacitor may be connected in parallel between the inversion input terminal and the amplification terminal.

The image sensor may include an image control unit configured to convert an output voltage of the output terminal into digital image information.

According to example embodiments, an X-ray image sensing module is configured to use a direct photon counting mode and includes at least one image sensing chip electrically connected to an X-ray sensing unit. The at least one image sensing chip includes a pixel array having a plurality of single pixels. Each of the single pixels of the pixel array includes a charge sensing amplifier configured to amplifying charges sensed by the X-ray sensing unit. The charge sensing amplifier includes an input terminal, an amplification terminal, an output terminal, a first capacitor connected between the input terminal and the amplification terminal, a first switch connected between the input terminal and the amplification terminal, a second capacitor connected between the amplification terminal and the output terminal, and a second switch connected between the output terminal and the input terminal.

The X-ray image sensing module may further include a delay unit connected to the second switch. The delay unit may be configured to receive a reset signal and output a delayed reset signal. The second switch may be configured to be turned on in response to the delayed reset signal. The first switch may be configured to be turned on in response to the reset signal. The second switch may be configured to be turned on for a longer duration in response to the delayed reset signal than the first switch is configured to be turned on in response to the reset signal.

A capacitance of the second capacitor may be greater than a capacitance of the first capacitor.

The first switch and the first capacitor may be connected in parallel between the inversion input terminal and the amplification terminal.

The X-ray image sensing module may further include an image control unit configured to convert an output voltage of the output terminal into digital image information.

An X-ray image processing apparatus may include a body defining an image region, a plurality of the X-ray image sensing modules surrounding the image region, a supporting unit configured to fix a target object in the image region, and an image processing unit configured to generate an image of the target object based on digital image information generated by the plurality of the X-ray image sensing modules.

According to example embodiments, a charge sensing amplifier may include an amplification unit including an amplification terminal and at least one input terminal, a first capacitor connected between one of the at least one input terminal and the amplification terminal, an output terminal, a second capacitor connected between the amplification terminal and the output terminal, a reference voltage terminal, and a second switch connected between the output terminal and the reference voltage terminal.

The first capacitor and the first switch may be connected in parallel between the inversion input terminal and the amplification input terminal.

A capacitance of the second capacitor may be greater than a capacitance of the first capacitor.

A delay unit may be connected to the second switch. The delay unit may be configured to receive a reset signal having a first pulse width and output a delay reset signal for turning on the second switch. The delay reset signal may have a second pulse width that is greater than the first pulse width.

The amplification unit may be an operational amplifier (OP-AMP) including an inversion input terminal and a non-inversion input terminal. The first capacitor may be connected between the inversion input terminal and the amplification terminal. The first switch may be connected between the inversion input terminal and the amplification terminal. The reference voltage terminal may be connected to the non-inversion input terminal, and the amplification terminal may be configured to output an amplified voltage based on the difference between voltages at the inversion and non-inversion input terminals.

The first capacitor and the first switch may be connected in parallel between the inversion input terminal and the amplification input terminal.

A capacitance of the second capacitor may be greater than a capacitance of the first capacitor.

A delay unit may be connected to the second switch. The delay unit may be configured to receive a reset signal having a first pulse width and output a delay reset signal for turning on the second switch. The delay reset signal may have a second pulse width that is greater than the first pulse width.

The charge sensing amplifier may further include an image control unit connected to the output terminal and configured to convert an output voltage of the output terminal to digital image information.

The image control unit may include a counter configured to generate digital image information based on counting the output voltage of the output terminal.

The charge sensing amplifier may include a comparator connected between the output terminal and the image control unit. The comparator may be configured to output a comparison result to the image control unit and the comparison result may be based on comparing the output voltage of the output terminal to a threshold voltage.

The comparator may include an inversion terminal and a non-inversion terminal. The inversion terminal may be connected to a threshold voltage supply. The non-inversion terminal may be connected to the output terminal.

According to example embodiments, a pixel may include a sensing unit connected to a charge sensing amplifier. The change sensing amplifier may include an amplification unit including an amplification terminal and an input terminal, An image sensing module may include a chip including an array of the pixels and a sensing unit electrically connected to the chip. The chip may be configured to generate digital information based on current generated by the sensing unit.

BRIEF DESCRIPTION OF THE DRAWINGS

These and/or other aspects will become apparent and more readily appreciated from the following description of non-limiting embodiments, taken in conjunction with the accompanying drawings in which like reference characters refer to the same parts throughout the different views. The drawings are not necessarily to scale, emphasis instead being placed upon illustrating the principles of inventive concepts. In the drawings.

DETAILED DESCRIPTION

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of example embodiments.

As used herein, expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
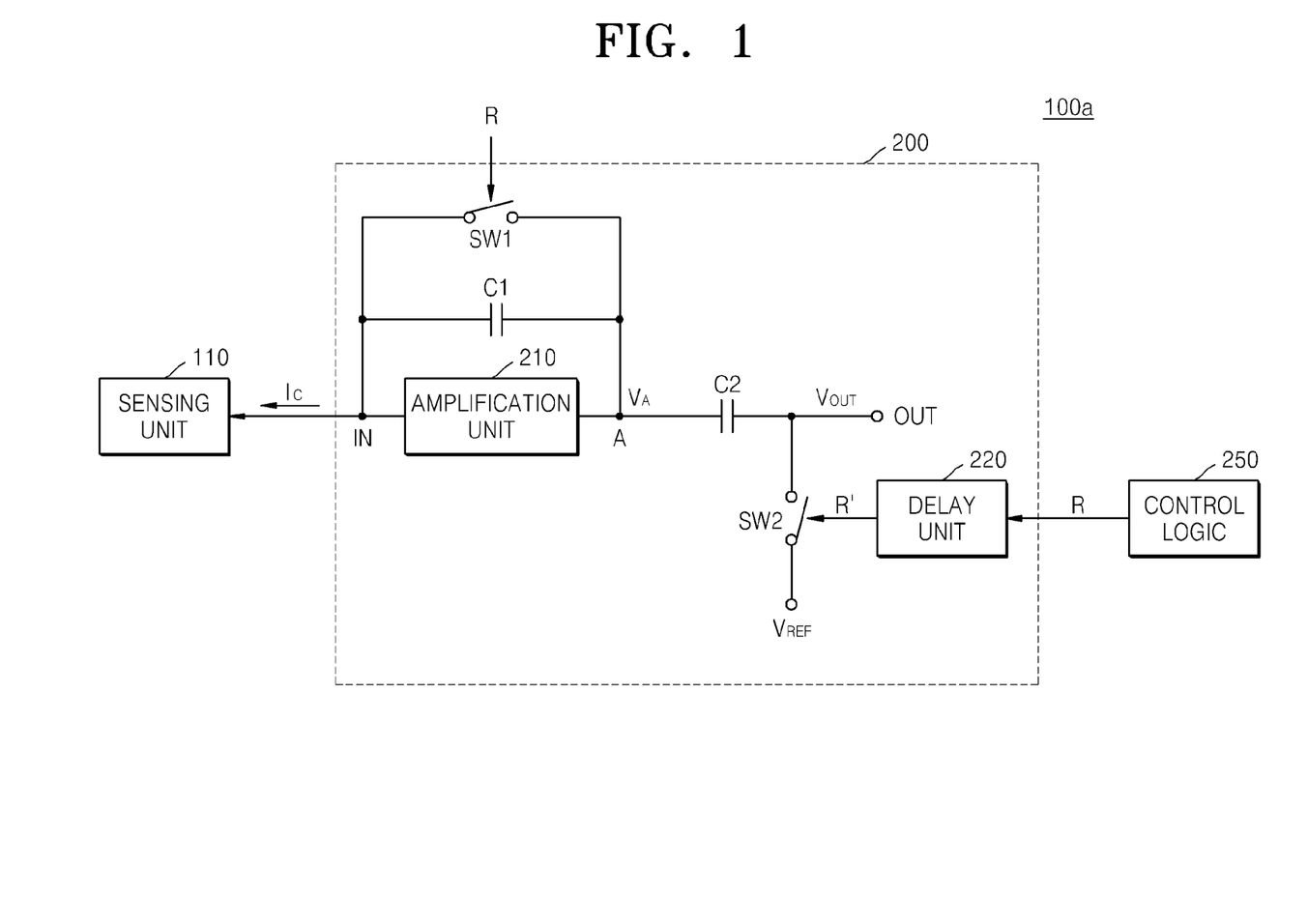
FIG. 1 is a circuit diagram of an image sensor according to example embodiments.

FIG. 1 is a circuit diagram of an image sensor 100$a$ according to example embodiments.

Referring to FIG. 1, the image sensor 100$a$ may include a sensing unit 110 and a charge sensing amplifier 200.

The sensing unit 110 may sense photons included in an optical signal, and may generate a pulse current $I_c$ corresponding to the sensed photons. For example, in an image sensor that uses a photon counting mode, the sensing unit 110 may be a photoconductor for generating a current by receiving an X-ray. However, example embodiments are not limited thereto. For example, in an image sensor that uses an indirect mode, the sensing unit 110 may be a photodiode and may include a scintillator. Alternatively, the sensing unit 110 may include a photomultiplier tube coupled to a scintillator instead of a photoconductor or a photodiode.

If the sensing unit 110 is a photoconductor, the photoconductor may contain CdTe, a-Se, HgI2, GaAs or a combination thereof. If the sensing unit 110 is a photodiode, the photodiode may contain Si, GaAs or a combination thereof. If the sensing unit 110 includes a scintillator, the scintillator may include CsI. However, example embodiments are not limited thereto.

The charge sensing amplifier 200 may sense and amplify charges sensed by the sensing unit 110. In more detail, the charge sensing amplifier 200 may include an amplification unit 210 for receiving the pulse current $I_c$ generated by the sensing unit 110 via an input terminal IN, amplifying the pulse current $I_c$, and outputting an amplified voltage $V_A$ via an amplification terminal A. Also, the charge sensing amplifier 200 may further include a first capacitor C1, a first switch SW1, a second capacitor C2, a second switch SW2, and a delay unit 220.

In the charge sensing amplifier 200, the first capacitor C1 may be connected between the input terminal IN and the amplification terminal A. The first capacitor C1 may store the charges sensed by the sensing unit 110. The stored charges may be amplified by the amplification unit 210 and may be output as the amplified voltage $V_A$. For example, the first capacitor C1 may have a capacity of less than about 10 femto-Farads (fF).

In the charge sensing amplifier 200, the first switch SW1 may be connected between the input terminal IN and the amplification terminal A. The first switch SW1 may discharge the charges stored in the first capacitor C1. In more detail, the first switch SW1 may be turned on by receiving a reset signal R, and thus may short the input terminal IN and the amplification terminal A. As such, the charges stored in the first capacitor C1 may be discharged. The first switch SW1 may be turned off when not receiving a reset signal R.

In the charge sensing amplifier 200, the second capacitor C2 may be connected between the amplification terminal A and an output terminal OUT. The second capacitor C2 may store charges corresponding to a voltage variation of the amplification terminal A caused by noise, and a variation of an output voltage VOUT of the output terminal OUT may be reduced. In more detail, the second capacitor C2 may store the charges corresponding to the voltage variation of the amplification terminal A caused by reset noise generated when the first switch SW1 is switched off. The second capacitor C2 may have a capacity greater than that of the first capacitor C1. For example, the second capacitor C2 may have a capacity in a range from about 10 to about 100 fF.

The second switch SW2 may be connected between the output terminal OUT and a reference voltage terminal $V_{REF}$ in the charge sensing amplifier 200. If the second switch SW2 is turned on, the output terminal OUT may be maintained at a reference voltage received from the reference voltage terminal $V_{REF}$. In more detail, the second switch SW2 may be turned on by receiving a delayed reset signal R', and thus the output terminal OUT may be maintained at the reference voltage regardless of the reset noise generated when the first switch SW1 is switched off. The second switch SW2 may be turned off when not receiving the delayed reset signal R'.

The delay unit 220 may be connected to the second switch SW2. In more detail, the delay unit 220 may receive the reset signal R and may generate and transmit the delayed reset signal R' to the second switch SW2. For example, if the reset signal R has a first pulse width, the delayed reset signal R' may have a second pulse width greater than the first pulse width. Accordingly, the second switch SW2 may be turned on for a longer period of time in comparison to the first switch SW1.

The image sensor 100a may include a control logic 250 for controlling an operation of the image sensor. It should be understood that the control logic 250 may be a hardware structure specifically configured to generate and transmit the reset signal R to turn on the first switch SW1 and to transmit the reset signal R to the Delay Unit 220. For example, the control logic 250 may be a control circuit or a microprocessor, but example embodiments are not limited thereto.

Figure 2:
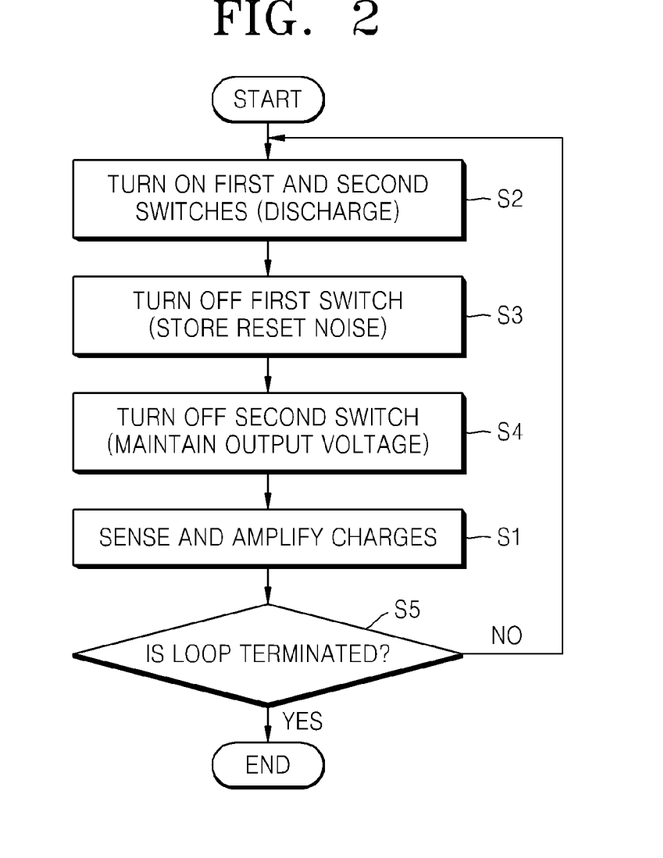
FIG. 2 is a flowchart of a method of operating the image sensor illustrated in FIG. 1, according to example embodiments.
Figure 3:
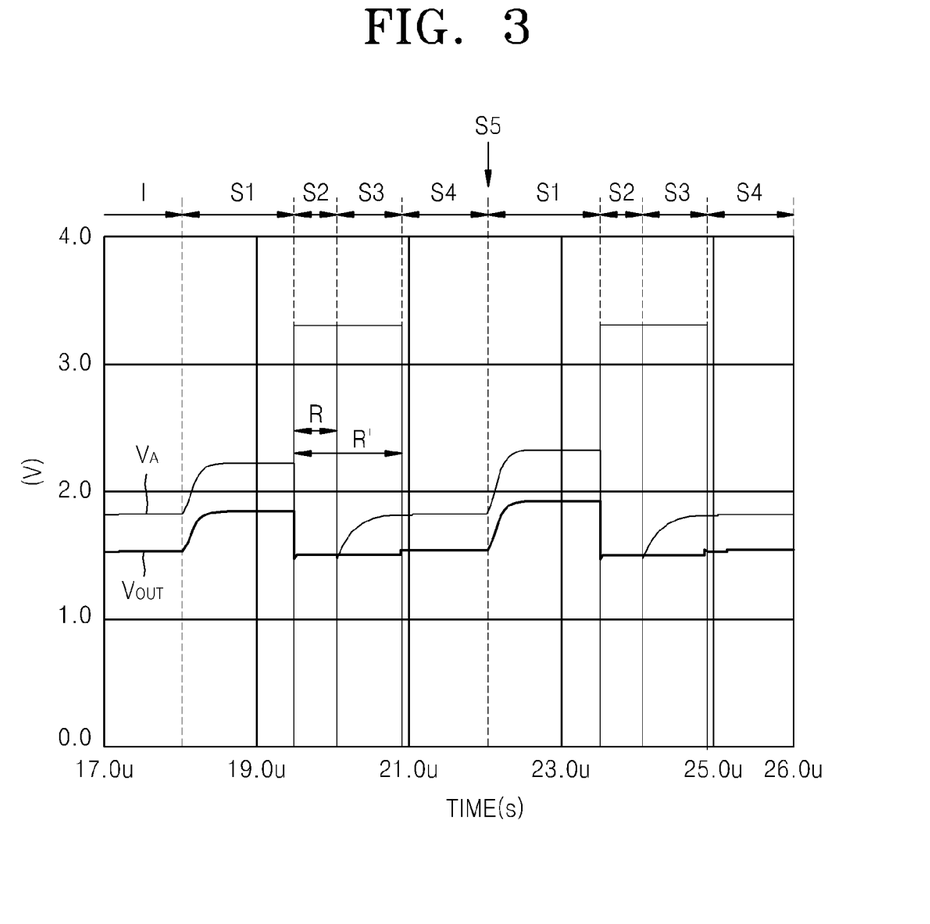
FIG. 3 is a graph showing waveforms of a reset signal, a delayed reset signal, an amplified voltage, and an output voltage generated when performing the method illustrated in FIG. 2.

FIG. 2 is a flowchart of a method of operating the image sensor 100a illustrated in FIG. 1, according to example embodiments. FIG. 3 is a graph showing waveforms of the reset signal R, the delayed reset signal R', the amplified voltage $V_A$, and the output voltage VOUT generated when performing the method illustrated in FIG. 2.

Referring to FIGS. 1 through 3, the first and second switches SW1 and SW2 are turned on (operation S2) in response to the reset signal R and the delayed reset signal R' respectfully. If the first switch SW1 is turned on, charges stored in the first capacitor C1 may be discharged. Accordingly, the amplified voltage $V_A$ is reduced, and thus the output voltage VOUT is also reduced. Meanwhile, if the second switch SW2 is turned on, the output terminal OUT may be maintained at a reference voltage.

The duration of the reset signal R and the delayed reset signal R', as shown in FIGS. 1, 3, and 8-10, can be adjusted by the controller 250 and/or delay unit 220 according to an operational speed of image sensors according to example embodiments. As such, the duration of the reset signal R and the delayed reset signal R' may range from about 10 ns to about 2 μs, but example embodiments are not limited thereto.

Then, the first switch SW1 is turned off (operation S3). If the first switch SW1 is turned off, reset noise may be generated. Since the second switch SW2 is maintained at the reference voltage, charges corresponding to a voltage variation of the amplification terminal A caused by the reset noise may be stored in the second capacitor C2.

After that, the second switch SW2 is turned off (operation S4). Since the charges corresponding to the voltage variation of the amplification terminal A caused by the reset noise are stored in the second capacitor C2, a variation of the output voltage $V_{OUT}$ of the output terminal OUT may be reduced.

If operations S2 through S4 are performed, the first and second capacitors C1 and C2 that store charges may be reset. Then, operation S1 may be performed. In operation S1, the sensing unit 110 may sense and amplify charges. The amplified charges may be output from the amplification terminal A as the amplified voltage $V_A$. Due to the amplified voltage $V_A$, the output voltage $V_{OUT}$ of the output terminal OUT is increased. The output voltage VOUT may be compared to a threshold voltage by a comparator 130 (see FIG. 10), and may be counted by a counter of an image control unit 120 (see FIG. 10). The comparing and counting operations will be described below with reference to FIG. 10.

Then, as long as a loop has not terminated in operation S5, the charges stored in the first and second capacitors C1 and C2 may be reset again in operations S2 through S4, and charges may be sensed and amplified again in operation S1.

Although not shown in FIG. 2, before operation S1, an initialization operation I (see FIGS. 4 and 5) may be performed. In this case, operations S2 through S4 may be included in the initialization operation I. The initialization operation I will now be described in detail with reference to FIGS. 4 and 5.

Figure 4:
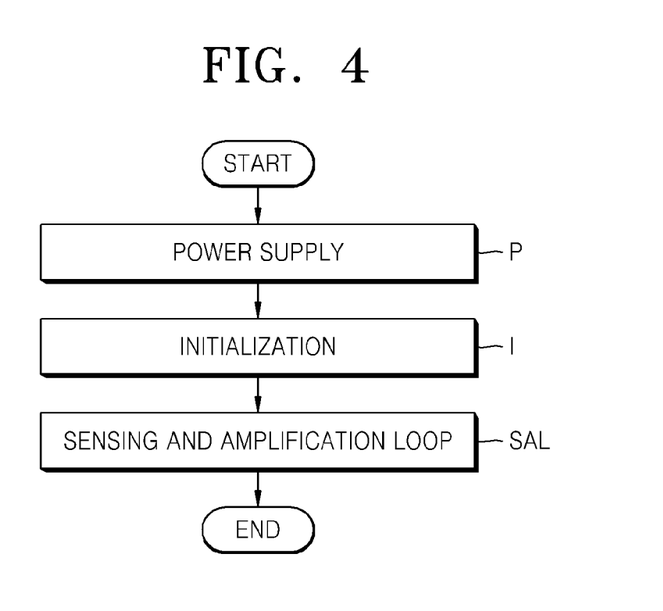
FIG. 4 is a flowchart of a method of operating the image sensor illustrated in FIG. 1, according to example embodiments.
Figure 5:
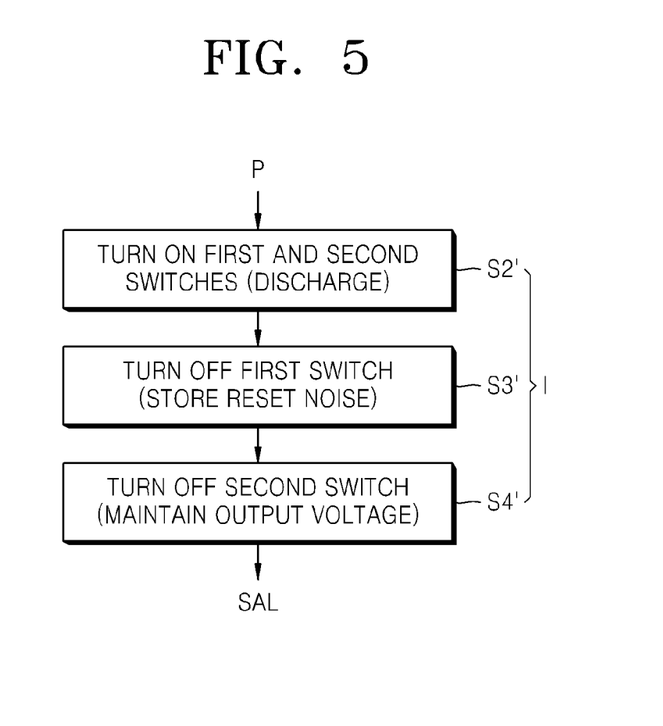
FIG. 5 is a detailed flowchart of an initialization operation illustrated in FIG. 4.

FIG. 4 is a flowchart of a method of operating the image sensor 100a illustrated in FIG. 1, according to example embodiments. FIG. 5 is a detailed flowchart of the initialization operation I illustrated in FIG. 4.

Referring to FIGS. 1 and 4, a power supply operation P is performed to supply power to the image sensor 100a. The control logic 250 may be configured to control an amount of power supplied to the image sensor 100a from a power source (not shown), but example embodiments are not limited thereto. Then, the initialization operation I is performed. The initialization operation I may be an operation for resetting charges possibly remaining in the first and second capacitors C1 and C2 of the image sensor 100a. After the initialization operation I is performed, a sensing and amplification loop (SAL) may be executed. The sensing and amplification loop (SAL) may include operations S1 through S5 illustrated in FIG. 2. That is, in the sensing and amplification loop (SAL), operation S1 for sensing and amplifying charges, and operations S2 through S4 for resetting the charges stored in the first and second capacitors C1 and C2 due to operation S1 may be repeated.

FIG. 5 shows the initialization operation I in detail. Referring to FIGS. 1 and 5, after the power supply operation P is performed, the first and second switches SW1 and SW2 are turned on (operation S2'). If the first switch SW1 is turned on, charges possibly remaining in the first capacitor C1 may be discharged.

Then, the first switch SW1 is turned off (operation S3'). If the first switch SW1 is turned off, reset noise may be generated. Since the second switch SW2 is maintained at a reference voltage, charges corresponding to a voltage variation of the amplification terminal A caused by the reset noise may be stored in the second capacitor C2.

After that, the second switch SW2 is turned off (operation S4'). Since the charges corresponding to the voltage variation of the amplification terminal A caused by the reset noise are stored in the second capacitor C2, a variation of the output voltage VOUT of the output terminal OUT may be reduced.

Operations S2' through S4' may respectively correspond to operations S2 through S4 illustrated in FIG. 2 and be included in the sensing and amplification loop (SAL). That is, it is shown that operations S2 through S4 (see FIG. 2) for discharging charges of the first and second capacitors C1 and C2 of the image sensor 100a in the sensing and amplification loop (SAL) may also be performed in the initialization operation I (see FIG. 4) performed after the power supply operation P.

Figure 6:
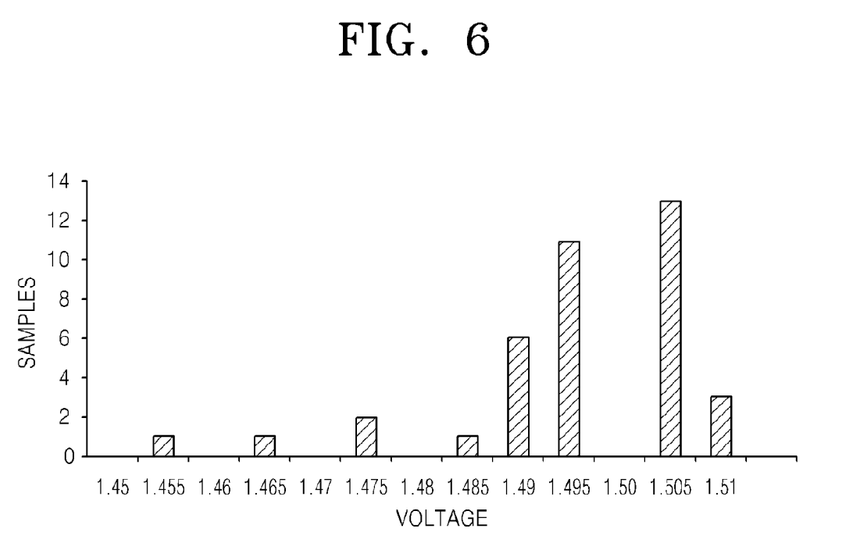
FIG. 6 is a graph showing a variation in an output voltage according to a variation in an external condition of a general image sensor.
Figure 7:
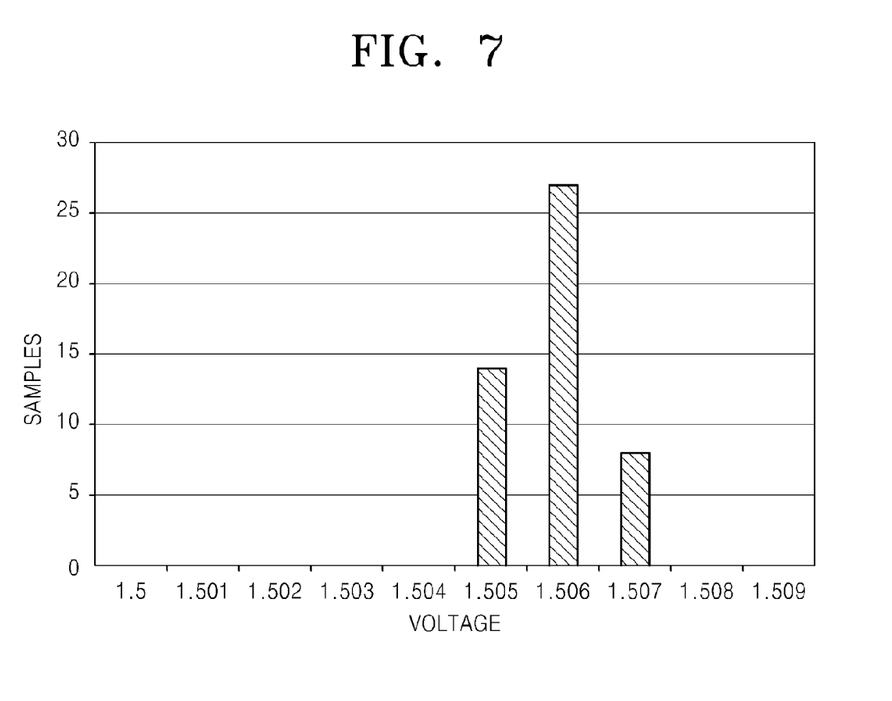
FIG. 7 is a graph showing a variation in an output voltage with respect to a variation in an external condition of an image sensor according to example embodiments.

FIG. 6 is a graph showing a variation in an output voltage according to a variation in an external condition of a general image sensor. FIG. 7 is a graph showing a variation in an output voltage according to a variation in an external condition of an image sensor according to example embodiments.

Referring to FIG. 6, in the general image sensor, an output voltage greatly varies (by about 55 mV) according to a variation in an external condition (e.g., a process, a voltage, or a temperature). The variation in an output voltage may occur because of an input offset voltage due to a restricted gain of an amplifier and because reset noise is generated. Since the reset noise is even input to an input terminal of the amplifier, is amplified, and influences the output voltage, the output voltage has a large distribution.

If the output voltage is not maintained at a reference voltage and varies according to a variation in an external condition, a sensor may not accurately perform a sensing operation and thus image quality may deteriorate.

However, in an image sensor according to example embodiments, as shown in FIG. 7, an output voltage relatively slightly varies (by about 3 mV) according to a variation in an external condition (e.g., a process, a voltage, or a temperature). Accordingly, in spite of a variation in an external condition, the output voltage may be maintained at a reference voltage and thus high-quality images may be obtained.

Figure 8:
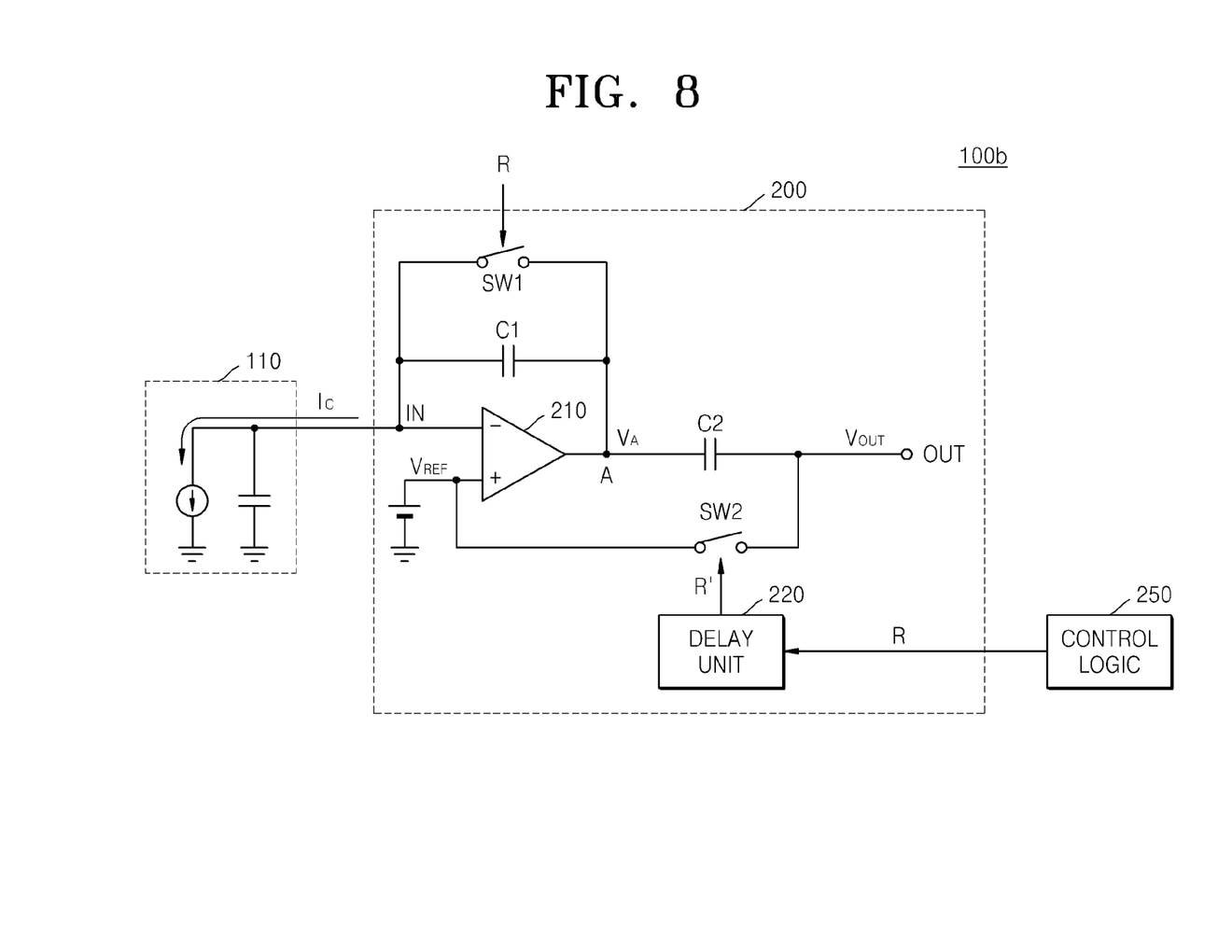
FIG. 8 is a circuit diagram of an image sensor according to example embodiments.

FIG. 8 is a circuit diagram of an image sensor 100b according to example embodiments. The image sensor 100b may be modified from the image sensor 100a illustrated in FIG. 1. Repeated descriptions of the embodiments of FIGS. 1 and 8 will not be provided here.

Referring to FIG. 8, an amplification unit 210 may be implemented as an operational amplifier (OP-AMP). In this case, an input terminal IN of the amplification unit 210 may include an inversion input terminal − and a non-inversion input terminal +, and the amplification unit 210 may output an amplified voltage $V_A$ obtained by amplifying a voltage difference between the inversion and non-inversion input terminals − and +.

The inversion input terminal − of the amplification unit 210 may be connected to the sensing unit 110 and may receive a pulse current $I_c$ generated by the sensing unit 110. The first capacitor C1 may be connected between the inversion input terminal − and the amplification terminal A and may store charges based on the pulse current $I_c$. The first switch SW1 may be connected between the inversion input terminal − and the amplification terminal A, and may discharge the charges stored in the first capacitor C1.

The non-inversion input terminal + of the amplification unit 210 may be connected to the reference voltage terminal VREF. The second switch SW2 may be connected between the output terminal OUT and the non-inversion input terminal +. Accordingly, if the second switch SW2 is turned on, the output terminal OUT may be maintained at a reference voltage.

Figure 9:
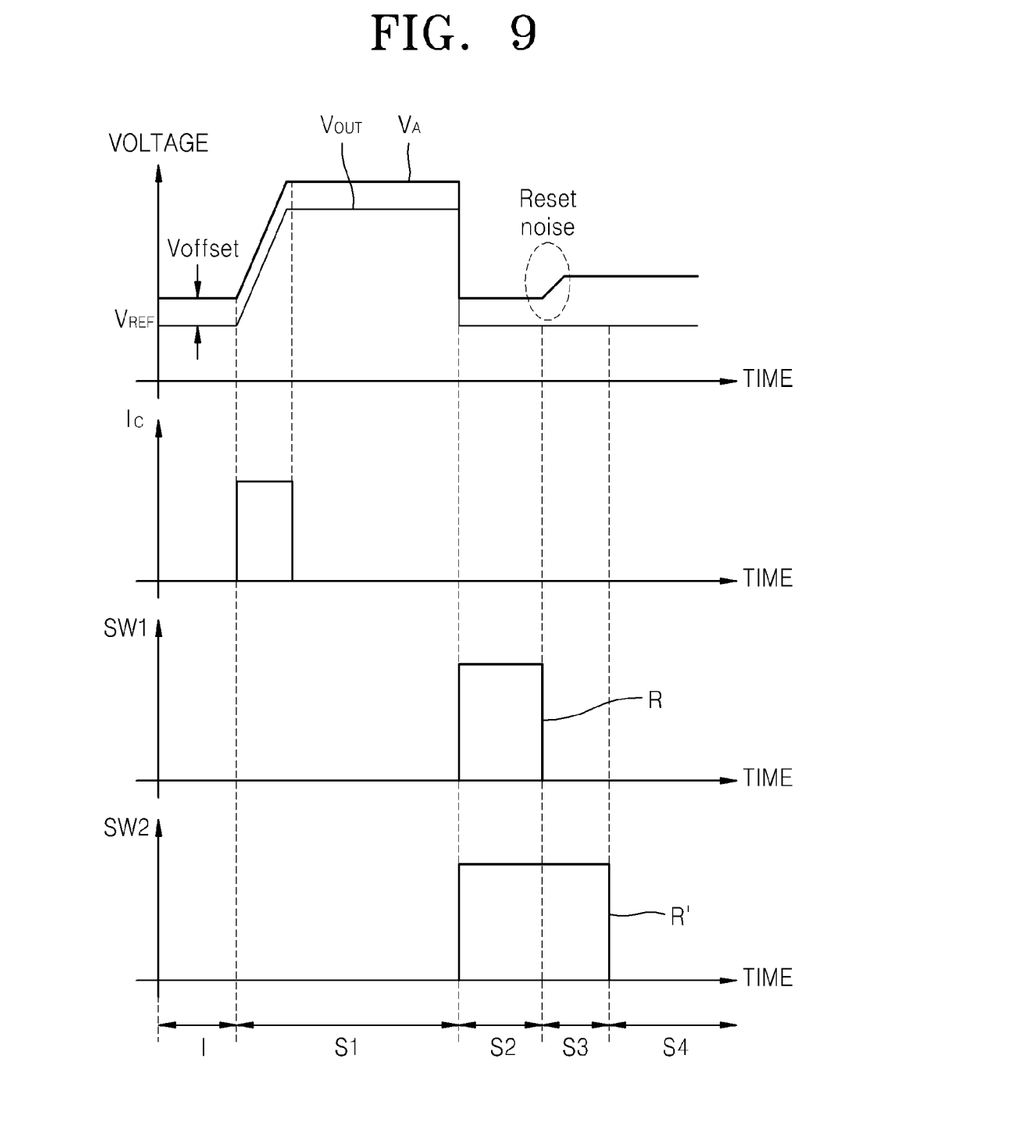
FIG. 9 is a graph showing waveforms of an amplified voltage, an output voltage, a pulse current, a reset signal, and a delayed reset signal generated when operating the image sensor illustrated in FIG. 8.

FIG. 9 is a graph showing waveforms of the amplified voltage $V_A$, the output voltage VOUT, the pulse current $I_c$, the reset signal R, and the delayed reset signal R' generated when operating the image sensor 100b illustrated in FIG. 8.

Referring to FIGS. 8 and 9, as a result of the initialization operation I, the output voltage VOUT is maintained at a reference voltage and the amplified voltage $V_A$ is maintained at a voltage obtained by summing the reference voltage and an offset voltage Voffset of the amplification unit 210. After that, if the sensing unit 110 generates the pulse current $I_c$, charges are stored in the first capacitor C1 and are amplified, and thus the amplified voltage $V_A$ and the output voltage VOUT are increased (see operation S1 illustrated in FIG. 2).

Then, the first and second switches SW1 and SW2 are turned on (see operation S2 illustrated in FIG. 2). If the first switch SW1 is turned on, the charges stored in the first capacitor C1 are discharged, and thus the amplified voltage $V_A$ and the output voltage VOUT are reduced. After that, the first switch SW1 is turned off (see operation S3 illustrated in FIG. 2), and thus reset noise may be generated.

While the reset noise is being generated, the second switch SW2 receives the delayed reset signal R' via the delay unit 220 and thus is continuously turned on. Accordingly, the output terminal OUT may be maintained at the reference voltage. Furthermore, since the second capacitor C2 is connected between the amplification terminal A and the output terminal OUT, even when the amplified voltage $V_A$ varies due to the reset noise, charges corresponding to the variation in the amplified voltage $V_A$ may be stored in the second capacitor C2. Consequently, the output voltage VOUT of the output terminal OUT may be prevented from greatly varying due to a switching operation of the first switch SW1.

Figure 10:
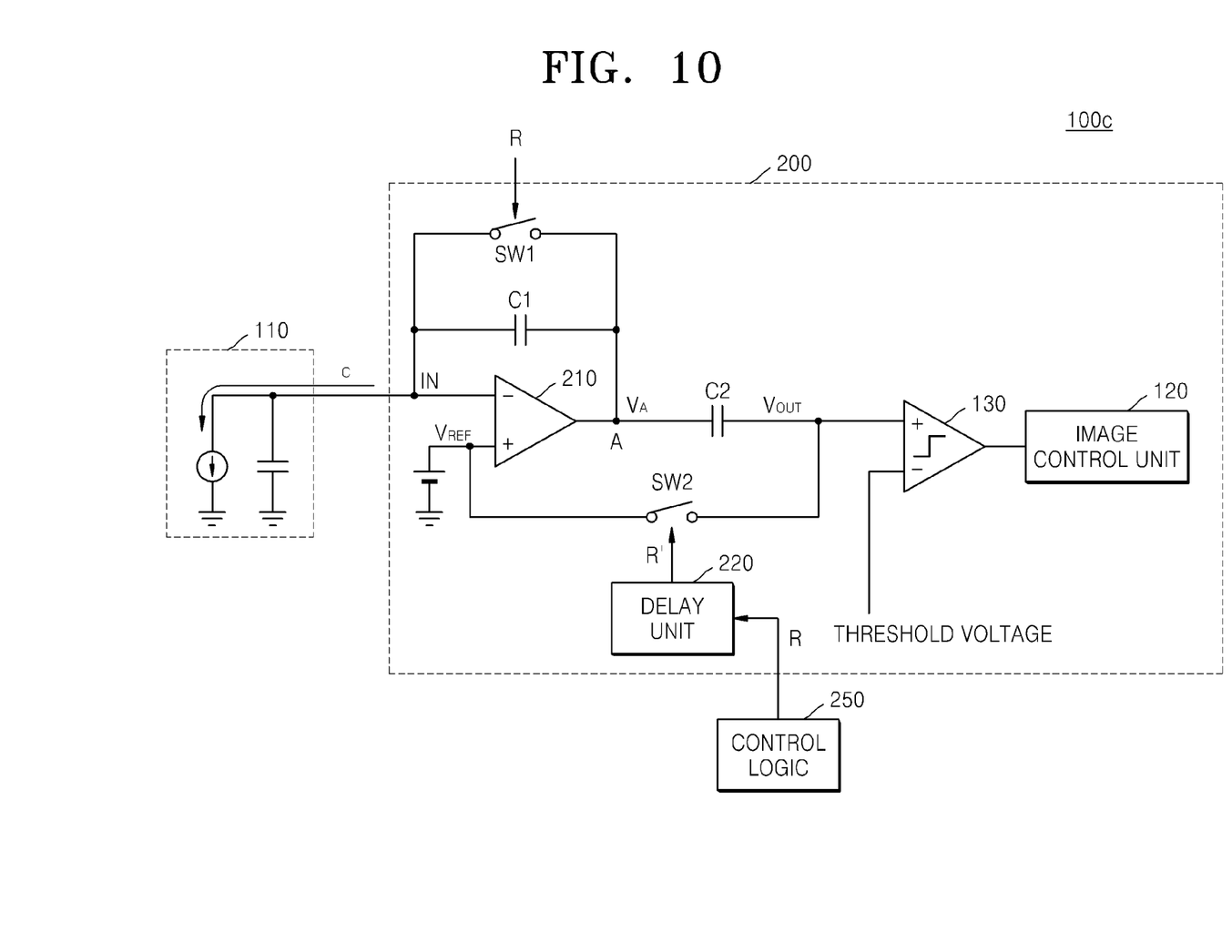
FIG. 10 is a circuit diagram of an image sensor according to example embodiments.

FIG. 10 is a circuit diagram of an image sensor 100c according to example embodiments. The image sensor 100c may be modified from the image sensor 100b illustrated in FIG. 8. Repeated descriptions of the embodiments of FIGS. 8 and 10 will not be provided here.

Referring to FIG. 10, the image sensor 100c may further include the comparator 130.

The image control unit 120 may convert the output voltage VOUT of the output terminal OUT into digital image information. In an image sensor that uses a photon counting mode, the image control unit 120 may include a counter, and the counter may count the output voltage VOUT generated based on charges sensed by the sensing unit 110, thereby generating the digital image information.

Optionally, the image sensor 100c may further include the comparator 130 connected between the image control unit 120 and the output terminal OUT. The comparator 130 may compare the output voltage VOUT of the output terminal OUT to a threshold voltage, and may transmit a comparison result to the image control unit 120.

Figure 11:
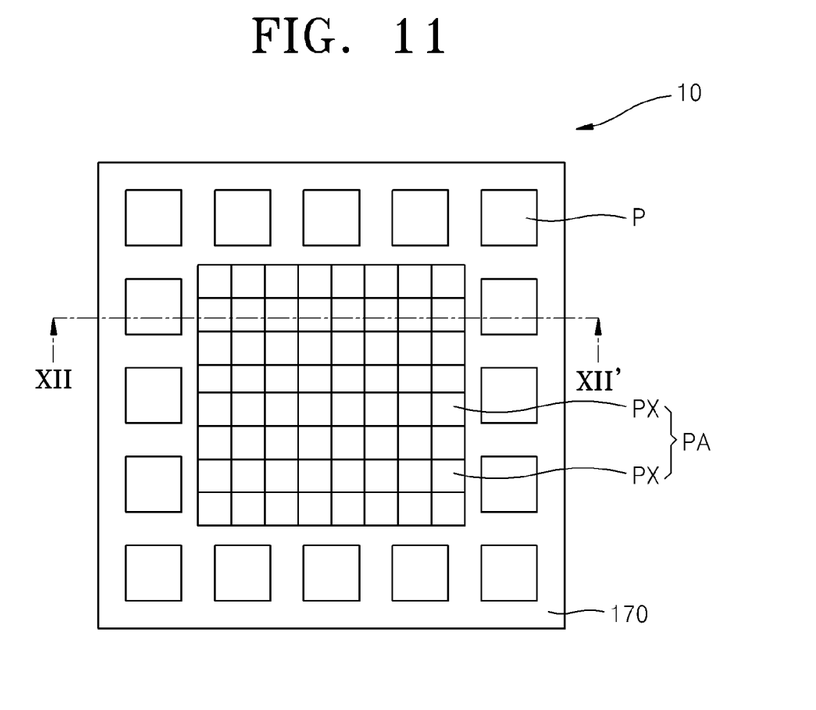
FIG. 11 is a cross-sectional view of an image sensing module according to example embodiments.
Figure 12:
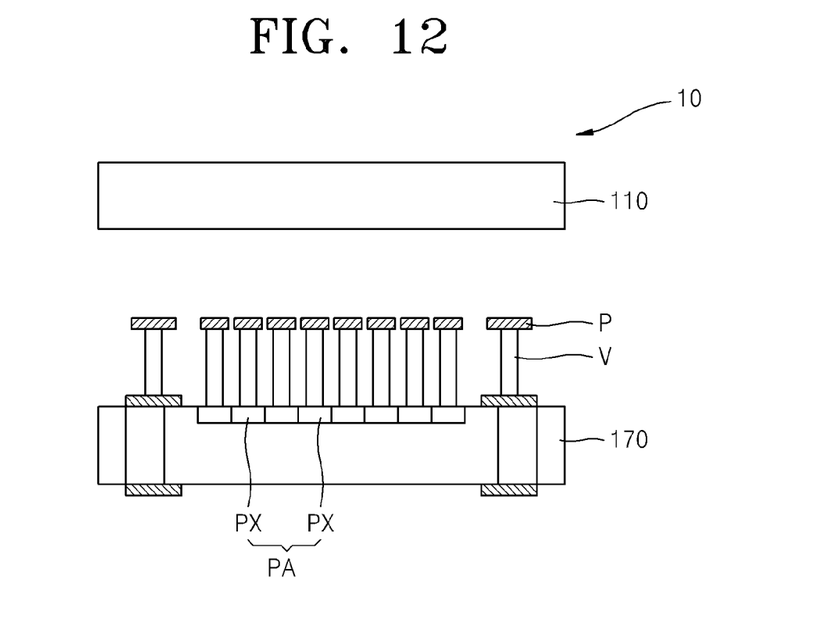
FIG. 12 is a cross-sectional view cut along a line XII-XII' illustrated in FIG. 11.

FIG. 11 is a cross-sectional view of an image sensing module 10 according to example embodiments. FIG. 12 is a cross-sectional view cut along a line XII-XII' illustrated in FIG. 11.

Referring to FIGS. 11 and 12, the image sensing module 10 may be an X-ray image sensing module that uses a direct photon counting mode. The direct photon counting mode may be a mode for obtaining an image based on a current generated by using a photoconductor, and the photoconductor may directly generate the current by receiving an X-ray. On the other hand, an indirect mode may be a mode for obtaining an image based on a current generated by using a scintillator and a photosensor such as a photodiode. The scintillator may generate photons by receiving an X-ray, and the photosensor such as a photodiode may generate the current by receiving the photons. In the direct photon counting mode, the image sensing module 10 may include an X-ray sensing unit 110 and an image sensing chip 170. Alternatively, the sensing unit 110 may include a photomultiplier tube coupled to a scintillator instead of a photoconductor or a photodiode.

The X-ray sensing unit 110 may generate a current by receiving an X-ray. The X-ray sensing unit 110 may be electrically connected to the image sensing chip 170 via vias V and pads P.

The image sensing chip 170 may generate digital image information based on the current generated by the X-ray sensing unit 110. The image sensing chip 170 may include a pixel array PA including a plurality of single pixels PX. Each of the single pixels PX may include the image sensor 100a, 100b, or 100c illustrated in FIG. 1, 8, or 10.

It should be noted that each of the single pixels PX includes the charge sensing amplifier 200. In an X-ray image sensing module that uses a photon counting mode, since the single pixels PX operate asynchronously to each other, each of the single pixels PX has to include the charge sensing amplifier 200 to individually process an image sensing operation of the single pixels PX. The image sensor 100a, 100b, or 100c may realize correlation double sampling (CDS) by using only a simple circuit configuration (the second capacitor C2, the second switch SW2, and the delay unit 220 illustrated in FIG. 1). Accordingly, single pixels individually using CDS may operate asynchronously to each other, and thus a high-quality digital X-ray image may be obtained.

Figure 13:
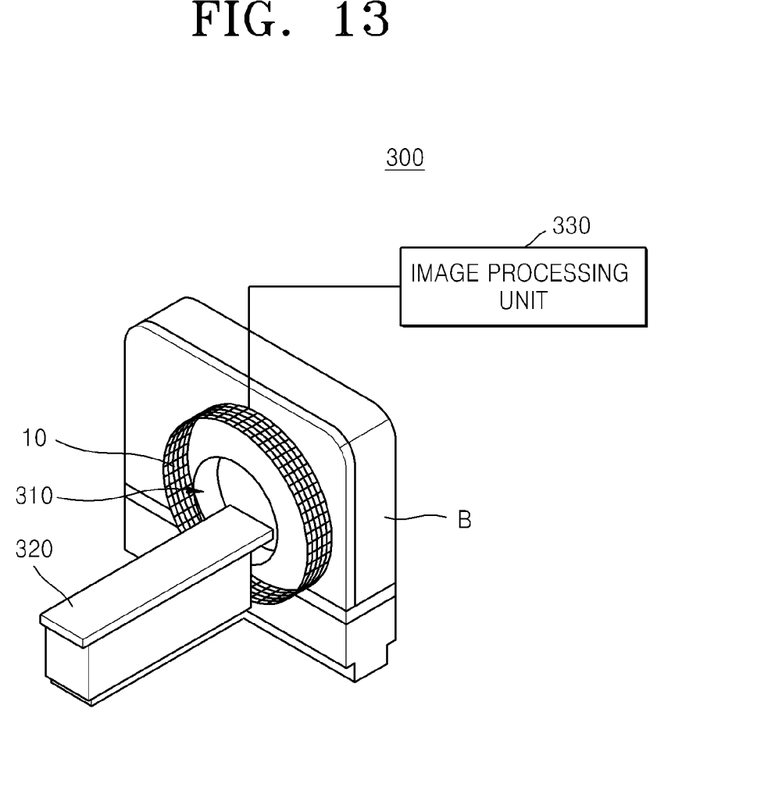
FIG. 13 is a schematic perspective view of an X-ray imaging apparatus according to example embodiments.

FIG. 13 is a schematic perspective view of an X-ray imaging apparatus 300 according to example embodiments.

Referring to FIG. 13, the X-ray imaging apparatus 300 may include an image region 310, a plurality of X-ray image sensing modules 10, and an image processing unit 330.

The image region 310 is a region for accommodating a target object, and is provided to obtain an image of the target object. The image region 310 may be defined by a body B of the X-ray imaging apparatus 300. A supporting unit 320 may be included in the image region 310 to fix the target object. Each of the X-ray image sensing modules 10 may receive an X-ray transmitted through the target object and may convert the X-ray into digital image information. Each of the X-ray image sensing modules 10 may be the image sensing module 10 illustrated in FIG. 11, and thus repeated descriptions of the X-ray image sensing modules 10 will not be provided here. The image processing unit 330 may generate an image of the target object based on the digital image information generated by the X-ray image sensing modules 10.

As described above, an image sensor according to example embodiments may be resistant (and/or substantially resistant) to external conditions and various types of noise of an internal circuit. Therefore, high-quality images may be obtained.

The image sensor may realize CDS by using only a simple circuit configuration. Accordingly, single pixels that operate asynchronously to each other may individually use CDS, and thus a high-quality digital X-ray image may be obtained.

While X-ray image sensing modules according to example embodiments have been described with reference to FIGS. 11-13, example embodiments are not limited thereto. An image sensor according to example embodiments may applied to a radiation sensor and/or medical imaging instruments configured to detect other portions of the electromagnetic spectrum (e.g., visible, infrared, etc.) than or in addition to X-rays.

Figure 14:
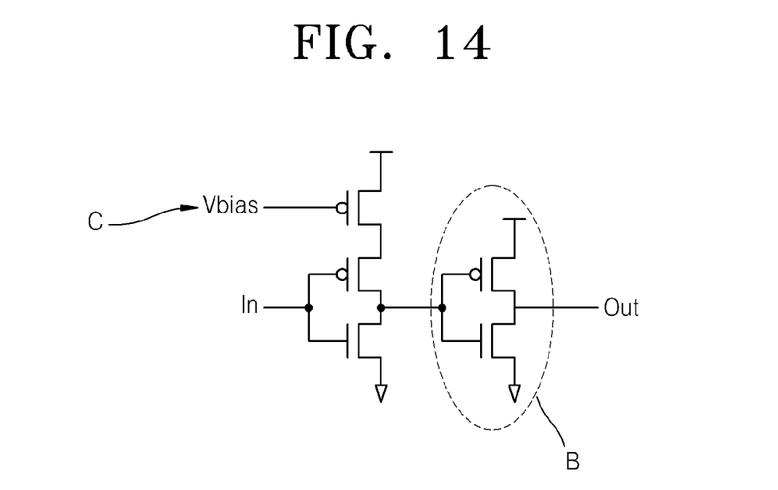
FIG. 14 is a circuit diagram corresponding to a non-limiting example of a delay unit in an image sensor according to example embodiments.

FIG. 14 is a circuit diagram corresponding to a non-limiting example of a delay unit in an image sensor according to example embodiments.

Referring to FIG. 14, a delay unit 220 of an image sensor may include two pmos transistors and an nmos transistor in portion C, and an inverter as shown by portion B may be added to the delay unit. Referring to portion C of the delay unit in FIG. 14, a bias voltage Vbias applied to the top pmos transistor may be controlled such that a current I can increase or decrease, thereby adjusting a delay time.

While FIG. 14 illustrates one example of a delay, image sensors according to example embodiments are not limited to the delay unit illustrated in FIG. 14. One having ordinary skill in the art would appreciate that other delay unit configurations may be function sufficiently and could be substituted into an image sensor according to example embodiments.

While some example embodiments have been particularly shown and described, it will be understood by one of ordinary skill in the art that variations in form and detail may be made therein without departing from the spirit and scope of the claims. Descriptions of features or aspects within some example embodiments should typically be considered as available for other similar features or aspects in other example embodiments.

The invention claimed is:

1. An image sensing apparatus comprising:
a sensing unit, and a charge sensing amplifier connected to the sensing unit, the charge sensing amplifier being configured to receive a signal from the sensing unit and to amplify the signal,
the charge sensing amplifier including an input terminal, an amplification terminal, an output terminal, a first capacitor, a second capacitor, a first switch, a second switch, and a reference voltage terminal,
wherein the first capacitor and the second capacitor are electrically connected between the input terminal and the output terminal,
wherein the first switch is electrically connected between the input terminal and the output terminal, and
wherein the second switch is connected between the output terminal and the reference voltage terminal.

2. The image sensor of claim 1,
wherein the first capacitor is electrically connected between the input terminal and the amplification terminal,
the second capacitor is electrically connected between the amplification terminal and the output terminal, and
the first switch is electrically connected between the input terminal and the amplification terminal.

3. The image sensor of claim 2, wherein
the input terminal of the charge sensing amplifier comprises an inversion input terminal and a non-inversion input terminal, and
the amplification terminal is configured to output an amplified voltage obtained by amplifying a voltage difference between the inversion and non-inversion input terminals.

4. The image sensor of claim 3, wherein
the inversion input terminal is connected to the sensing unit, and
the non-inversion input terminal is connected to the reference voltage terminal.

5. The image sensor of claim 4, wherein
the first capacitor and the first switch are connected between the inversion input terminal and the amplification terminal, and
the second switch is connected between the non-inversion input terminal and the output terminal.

6. The image sensor of claim 2, further comprising:
a delay unit connected to the second switch, and
wherein the first switch is configured to be turned on after receiving a reset signal, and
the second switch is configured to be turned on after receiving a delayed reset signal from the delay unit,
the delayed reset signal obtained from the delay unit delaying the reset signal.

7. The image sensor of claim 2, wherein
the first and second switches are configured to be turned on by receiving a reset signal and a delayed reset signal, respectively, and
the second switch is configured to be turned on for a longer period of time in comparison to the first switch.

8. The image sensor of claim 2, wherein a capacitance of the second capacitor is greater than a capacitance of the first capacitor.

9. The image sensor of claim 1, further comprising:
an image control unit configured to convert an output voltage of the output terminal into digital image information.

10. The image sensor of claim 9, wherein the image control unit comprises a counter, wherein the image control unit further comprises a comparator connected between the output terminal of the charge sensing amplifier and the counter.

11. An X-ray image sensing module comprising:
an X-ray sensing unit, and at least one image sensing unit connected to the X-ray sensing unit,
each of the at least one image sensing unit including a sensing unit and a charge sensing amplifier electrically connected to the sensing unit,
the charge sensing amplifier including an input terminal, an amplification terminal, an output terminal, a first capacitor, a second capacitor, a first switch, a second switch, and a reference voltage terminal,
wherein the first capacitor and a the second capacitor are connected between the input terminal and the output terminal,
wherein the first switch is connected between the input terminal and the output terminal, and
wherein the second switch is connected between the output terminal and the reference voltage terminal.

12. The X-ray image sensing module of claim 11,
wherein the first capacitor is electrically connected between the input terminal and the amplification terminal,
the second capacitor is electrically connected between the amplification terminal and the output terminal, and
the first switch is electrically connected between the input terminal and the amplification terminal.

13. The X-ray image sensing module of claim 12 further comprising:
a delay unit connected to the second switch, wherein
the delay unit is configured to receive a reset signal and output a delayed reset signal,
the second switch is configured to be turned on in response to the delayed reset signal,
the first switch is configured to be turned on in response the reset signal, and
the second switch is configured to be turned on for a longer duration in response the delayed reset signal than the first switch is configured to be turned on in response to the reset signal.

14. The X-ray image sensing module of claim 12, wherein a capacitance of the second capacitor is greater than a capacitance of the first capacitor.

15. The X-ray image sensing module of claim 12, wherein the first switch and the first capacitor are connected in parallel between the inversion input terminal and the amplification terminal.

16. The X-ray image sensing module of claim 12, further comprising:
an image control unit configured to convert an output voltage of the output terminal into digital image information.

17. The X-ray image sensing module of claim 12, wherein the X-ray sensing unit is electrically connected to the image sensing chip through vias and pads.

18. A charge sensing amplifier for an image sensing device, the charge sensing amplifier comprising:
an amplification unit, at least one input terminal, an amplification terminal, at least one output terminal, a first capacitor, a second capacitor, a first switch, a second switch, and a reference voltage terminal,
wherein the first capacitor and the second capacitor are electrically connected between a first input terminal of the at least one input terminal and a first output terminal of the at least one output terminal,
wherein the first switch is electrically connected between the first input terminal and the first output terminal, and
wherein the second switch is connected between the output terminal and the reference voltage terminal.

19. The charge sensing amplifier of claim 18, further comprising:
the first capacitor is electrically connected between the first input terminal and the amplification terminal,
the second capacitor is electrically connected between the amplification terminal and the output terminal, and
the first switch is electrically connected between the first input terminal and the amplification terminal.

20. The charge sensing amplifier of claim 19, wherein
the first capacitor and the first switch are connected in parallel between the first input terminal and the amplification input terminal.

21. The charge sensing amplifier of claim 20, wherein a capacitance of the second capacitor is greater than a capacitance of the first capacitor.

22. The charge sensing amplifier of claim 21, further comprising:
a delay unit connected to the second switch, wherein
the delay unit is configured to receive a reset signal having a first pulse width and output a delayed reset signal for turning on the second switch,
the delayed reset signal having a second pulse width that is greater than the first pulse width.

23. The charge sensing amplifier of claim 22, wherein
the amplification unit is an operational amplifier (OP-AMP) including an inversion input terminal and a non-inversion input terminal,
the first capacitor is connected between the inversion input terminal and the amplification terminal,
the first switch is connected between the inversion input terminal and the amplification terminal,
the reference voltage terminal is connected to the non-inversion input terminal, and
the amplification terminal is configured to output an amplified voltage based on the difference between voltages at the inversion and non-inversion input terminals.

24. The charge sensing amplifier of claim 19, further comprising:
an image control unit connected to the output terminal, wherein
the image control unit is configured to convert an output voltage of the output terminal to digital image information.

25. The charge sensing amplifier of claim 24, wherein the image control unit includes a counter configured to generate digital image information based on counting the output voltage of the output terminal.

* * * * *